July 19, 1966 C. R. BRADLEE ETAL 3,261,196
METHOD FOR MAKING HOLLOW ARTICLES
Filed May 8, 1964 4 Sheets-Sheet 2
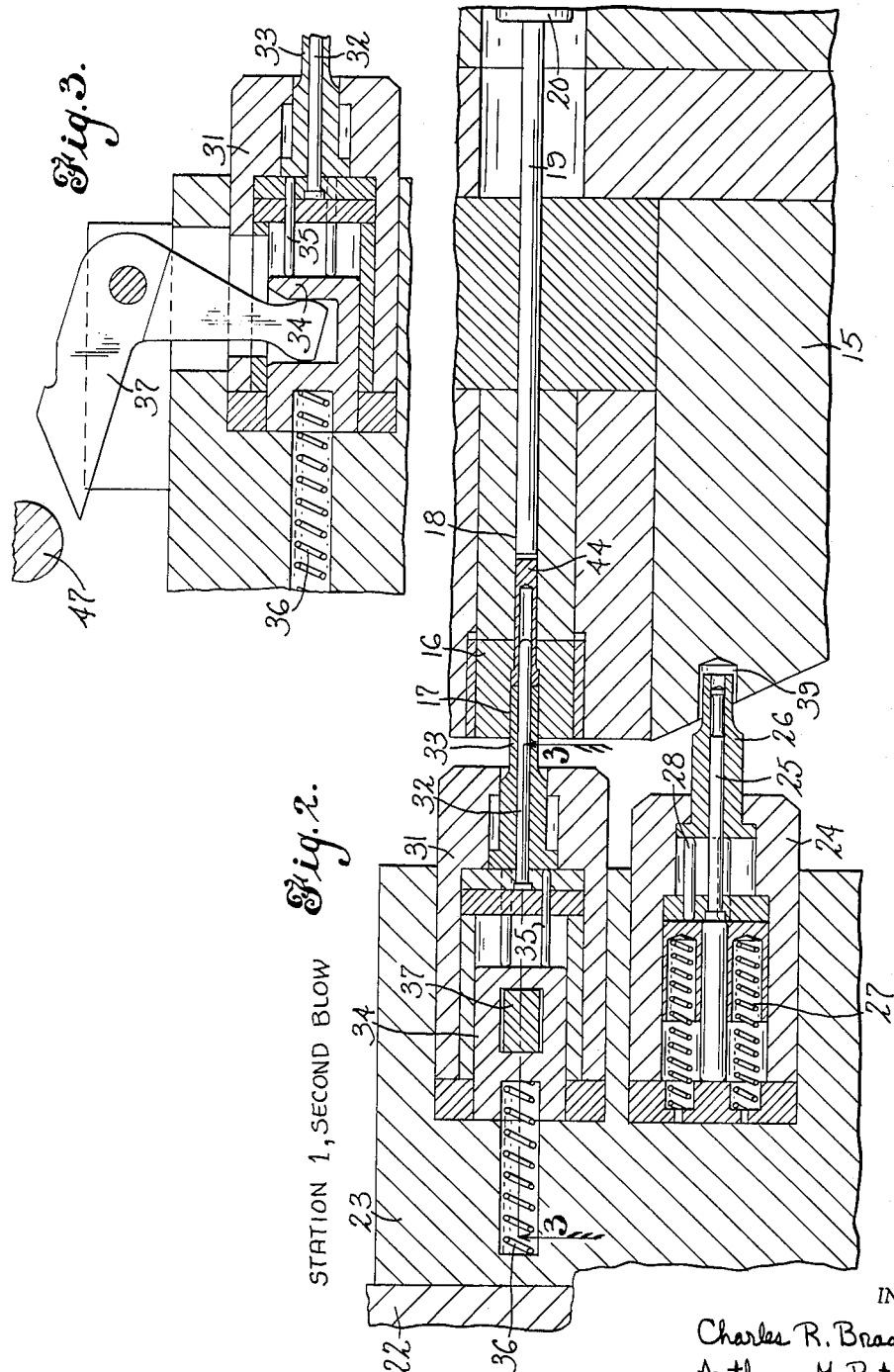
INVENTORS
Charles R. Bradlee
Anthony M. Putetti
BY Rockwell and DeLio
ATTORNEYS

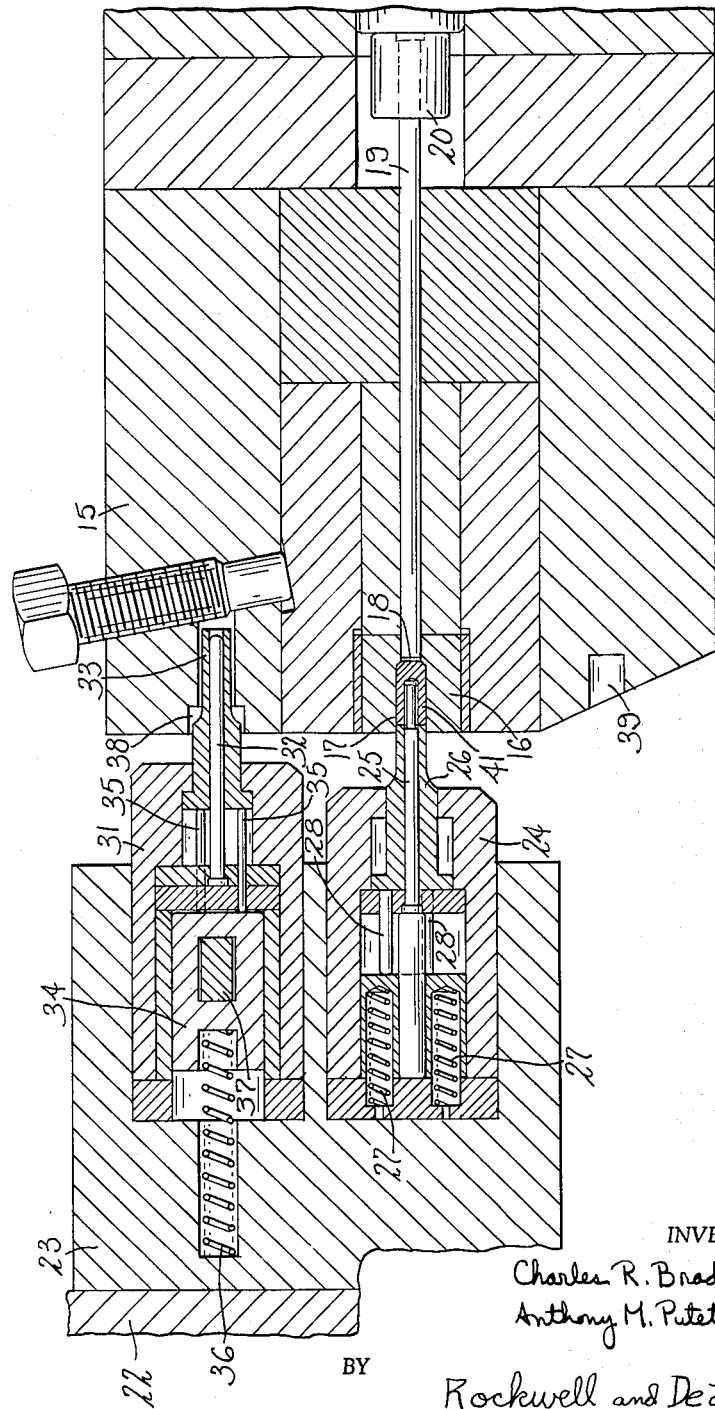

STATION 2, FIRST BLOW

INVENTORS
Charles R. Bradlee
Anthony M. Putetti
BY Rockwell and De Lio
ATTORNEYS

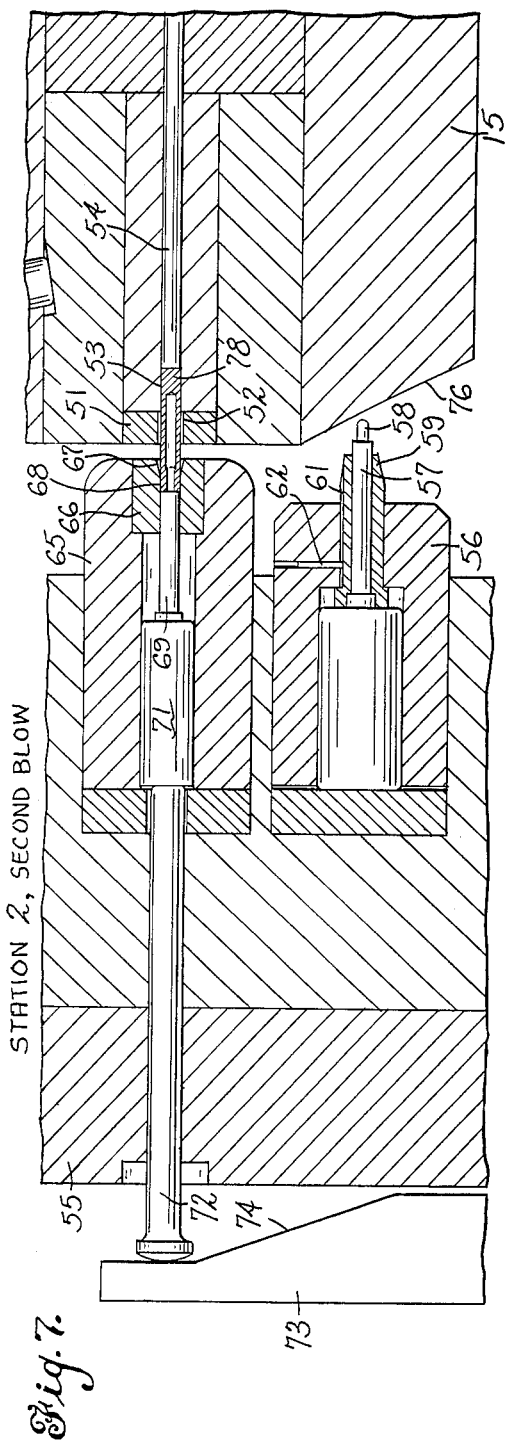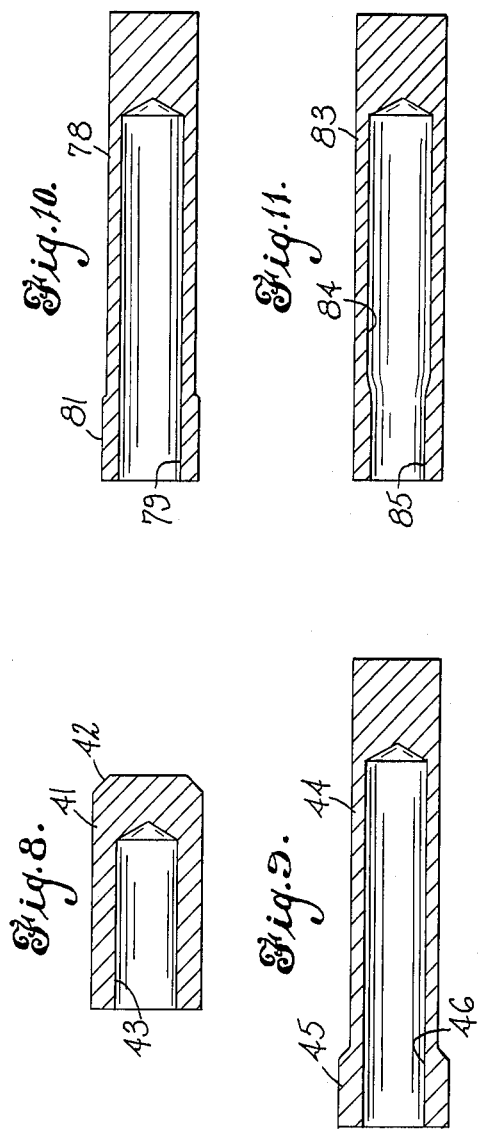

United States Patent Office 3,261,196
Patented July 19, 1966

3,261,196
METHOD FOR MAKING HOLLOW ARTICLES
Charles R. Bradlee, Cheshire, and Anthony M. Putetti, Waterbury, Conn., assignors to Textron, Inc., Providence, R.I., a corporation of Rhode Island
Filed May 8, 1964, Ser. No. 365,915
6 Claims. (Cl. 72—343)

This invention relates generally to a method for making hollow articles and more particularly to a method of consecutively forming from a cylindrical workpiece an elongated cylindrical article having a bore whose diameter at the open end is smaller than the internal diameter. In forming an article from a cylindrical workpiece, substantial metal flow is required. Since a relatively hard material is usually involved, the workpiece must be formed in several consecutive steps to avoid excessive strain and fracture. Operations of this type are normally carried out in machines known as cold headers and it is the development of the sequence of operations which dictates the quality of the final article. While, in most cases, individual steps for operations may be known in the art, the particular steps or some of them, and the sequence thereof constitute the invention.

Accordingly, the primary purpose of this invention is to provide a method of forming an elongated article having a cylindrical bore whose internal diameter is greater than the diameter at the face.

Still other objects and advantages of the invention will in part be obvious and will in part be apparent from the specification.

Generally speaking, in accordance with the invention, two main stations are provided for performing the several steps on the workpiece. Each station utilizes a single die and a pair of shiftable punches so that two blows are imparted to the workpiece at each station. At the first station, a cylindrical workpiece is inserted in the die and a punch is forced into the workpiece to backward extrude a portion of the workpiece about the punch to lengthen the workpiece and provide a uniform central bore. After the punches of the first station are shifted, the second blow extrudes the workpiece in a forward direction to substantially increase its length and to provide a shoulder near the end of more entry. The workpiece is thereafter transferred to the second station where a portion of the previously formed shoulder is trimmed on the first blow and the remaining shoulder is ironed on the second blow to form a smooth cylindrical surface on the outside of the workpiece and to reduce the diameter of the bore near the end of bore entry.

The invention accordingly comprises the several steps and the relation of one or more of such steps with respect to each of the others thereof, which will be exemplified in the method hereinafter disclosed, and the scope of the invention will be indicated in the claims.

For a fuller understanding of the invention, reference is had to the following description taken in connection with the accompanying drawings, in which:

FIG. 1 is a partial sectional view taken along a vertical plane, of station 1 of a machine for making the hollow article in accordance with the instant invention, with the punches being shown in an advanced position on the first blow;

FIG. 2 is a view similar to FIG. 1, with the punches being shown in an advanced position on the second blow;

FIG. 3 is a partial sectional view taken along line 3—3 of FIG. 2;

FIG. 7 is a view similar to FIG. 4 with the punches being shown in an advanced position on the second blow;

FIG. 8 is a sectional view of the workpiece after it has received the first blow at station 1;

FIG. 9 is a sectional view of the workpiece after it has received the second blow at station 1;

FIG. 10 is a sectional view of the workpiece after it has received the first blow at station 2; and FIG. 11 is a sectional view of the completed workpiece.

Figure 4:
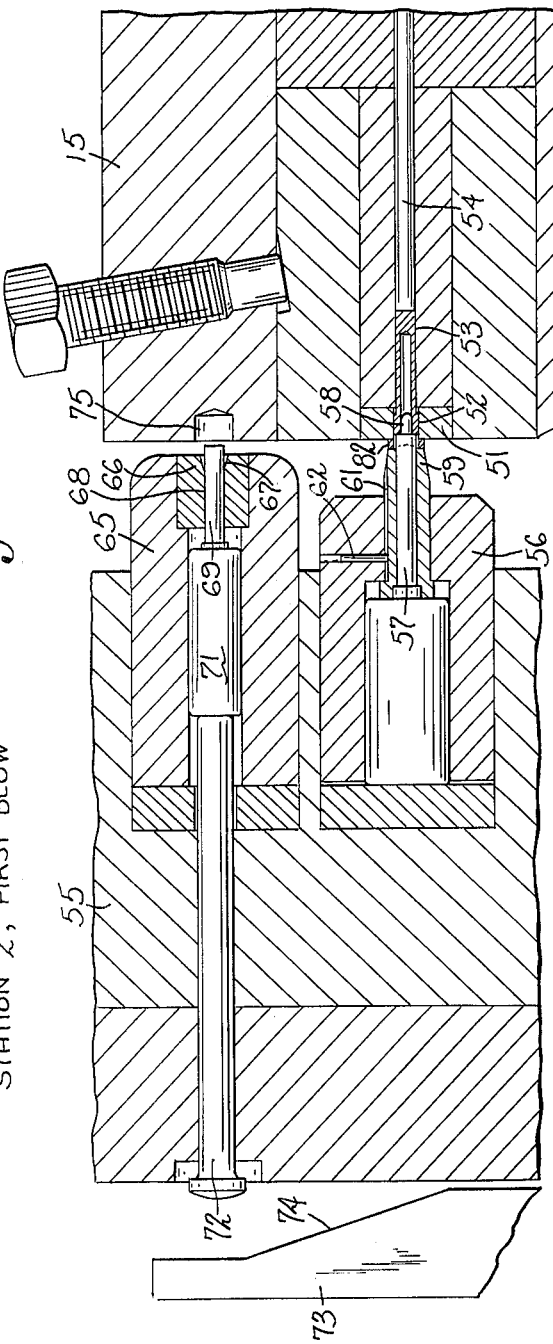
FIG. 4 is a partial sectional view taken along a vertical plane of station 2 of the machine for making the hollow article in accordance with the instant invention, with the punches being shown in an advanced position on the first blow.

The invention contemplates utilization of any of the many known types of heading machines fitted with the tooling to be hereafter described. As disclosed, the tooling may be considered to be mounted to a horizontal header having a cut-off station and at least two working stations with punch shifting mechanisms being provided for each station. At the cut-off station, continuous cylindrical stock is fed to the machine and cylindrical workpieces of the desired length are severed from the stock and transferred to the first working station in a timed sequence. A transfer mechanism is also provided to transfer the partially completed workpiece between the first and second station. Such machines normally include a frame including a die bed on which the dies are mounted and a reciprocable gate which advances and recedes toward and from the die bed. The gate is driven by suitable drive means which usually include a motor, a crankshaft and a pitman acting between the crankshaft and the gate. Since all the aforementioned mechanisms are well known in the art and form no part of the instant invention, detailed drawings and description thereof are deemed unnecessary.

Referring now to FIG. 1, a die bed 15 carries a first die 16 having a cylindrical cavity 17 which is beveled at the bottom within the die. An opening 18 extends into the cavity from the bottom thereof in which is received a knockout pin 19 secured to a plunger 20 for actuation of the knockout pin by suitable means (not shown). A gate 22 carries a shiftable punch plate 23. In punch plate 23 is mounted a first punch holder 24 in which is secured an extruding pin 25. Surrounding the extruding pin is a slidable stripper sleeve 26 which is urged outwardly by springs 27 and pins 28 carried within the punch holder. The normal position of the stripper sleeve and extruding pin is best shown in FIG. 2 where, in the rest position, the stripper sleeve is fully extended to completely encircle the extruding pin.

A second punch holder 31 is also mounted in punch plate 23 and carries a mandrel 32 and a slidable extruding punch 33. Extruding punch 33 contacts a slidable block 34 within the punch holder through pins 35. A spring 36 acting between the punch plate and the block urge the block and, through the pins, the extruding punch outwardly around the mandrel. The normal or rest position of the punch and mandrel are shown in FIG. 1. A cam-operated bellcrank 37 (FIG. 3) also co-operates with block 34 to provide positive means to outwardly drive the extruding punch to effect stripping of the workpiece, as will hereafter be described. A clearance bore 38 is provided in the die bed for receiving mandrel 32 and extruding punch 33 when the gate is in the advanced position and the second punch holder is in the non-operating position shown in FIG. 1. A clearance bore 39 is provided for receiving stripper sleeve 26 and extruding pin 25 when the gate is in the advanced position and the first punch holder is in the non-operating position shown in FIG. 2.

The sequence of operations at station 1 will now be described. Initially, a workpiece of predetermined length is severed from stock supplied to a cut-off station and the workpiece is transferred to first die 16. Knockout pin 19 is held in a partially advanced position so that it fills opening 18 and defines the bottom of cylindrical cavity 17. Gate 22 is advanced by suitable drive means to drive extruding pin 25 into the workpiece in the die cavity. The force of the advancing extruding pin causes the lower end of the workpiece to completely fill the bottom of the cavity and form a bevel thereon. The volume of the extruding punch causes the workpiece to be rearwardly extruded (extruded in a direction opposite to the direction of advancement of the extruding pin) about the extruding pin to form an elongated cylindrical workpiece having a central bore. The rearward extrusion of the workpiece causes the advancing extruded edge to abut the face of stripper sleeve 26, thereby forcing the stripper sleeve into the first punch holder against the action of springs 27. The fully-advanced position of the first blow at station 1 is shown in FIG. 1 and the resultant workpiece is shown at an enlarged scale in FIG. 8. Workpiece 41 has a cylindrical body with a bevel 42 at one end thereof and a cylindrical bore 43 entering the workpiece from the opposite end.

As the gate is retracted, springs 27 through pins 28 act on the stripper sleeve to hold the workpiece in the die as the extruding pin is withdrawn. When the gate is retracted, a suitable shifting mechanism (not shown) shifts the punch plate to bring second punch holder 31 into axial alignment with the first die. As the gate advances for the second blow, knockout pin 19 is withdrawn to the position shown in FIG. 2, to thereby open the central portion of the bottom of cylindrical cavity 17. The face of extruding punch 33 first strikes the workpiece and causes the extruding punch to recede into second punch holder 31 against the force of spring 36. As the gate continues to advance, mandrel 32 is inserted into the previously formed cylindrical bore in the workpiece to prevent collapse of the workpiece in the upcoming extruding operation. Extruding punch 33 continues to recede into the second punch holder until slidable block 34 abuts the punch plate. Thereafter, continued advancement of the gate causes both the mandrel and extruding punch to drive the workpiece into the opening vacated by the recession of knockout pin 19 to extrude the workpiece in a forward direction and greatly lengthen it as shown in FIG. 2. The fully advanced position of the gate is shown in FIG. 2 and, from the drawing, it may be seen that extruding punch 33 stops short of that plane that previously formed the bottom of the die cavity so as to leave a peripheral shoulder on the outer end of the workpiece.

The resulting workpiece is shown at enlarged scale in FIG. 9. Workpiece 44 has a cylindrical configuration, but is substantially longer and of smaller diameter than workpiece 41. A shoulder 45 remains on the workpiece, the diameter of the shoulder being approximately the same as the diameter of workpiece 41. The shoulder is adjacent the end of the workpiece from which a cylindrical bore 46 extends into the workpiece. Note that the previously formed bevel 42 has been eliminated by the reduction in workpiece diameter. The bevel was previously formed due to the configuration of the die with the beveled portion constituting the throat of the die for the extrusion operation performed on the second blow.

Subsequently, the gate recedes to withdraw the extruding punch and mandrel from the workpiece. In order to maintain control of the workpiece, it is desired that the workpiece remain in the die until the punch and mandrel have been withdrawn. After the extruding operation, the workpiece fits quite tightly about the mandrel and thus the workpiece must be positively stripped from the mandrel in order for the workpiece to remain in the die. This is accomplished through bellcrank 37 which advances block 34 under the action of a timed lever (not shown) rotating on a shaft 47 partially shown in FIG. 3. The lever holds extruding punch 33 in a forward position until the receding gate completely withdraws the mandrel from its position within bore 46. Thereafter, both the mandrel and extruding punch recede with the gate. After the punch and mandrel have been withdrawn, knockout pin 19 is advanced through plunger 20 to eject the workpiece from the die so that it may be gripped by a transfer mechanism (not shown) and transferred to the second station so that further operations may be performed thereon. At the proper time in the cycle, punch plate 23 also shifts to return the first punch holder into alignment with the first die so that a new severed blank may thereafter be acted on.

The second station is shown in FIGS. 4 through 7. Die bed 15 carries a second die 51 having a first cylindrical cavity 52 whose diameter is somewhat smaller than the diameter of shoulder 45 on workpiece 44 and a second inner cylindrical cavity 53 whose diameter is approximately equal to the outside diameter of the main portion of workpiece 44. A knockout rod 54 extends into the second cavity from the rear thereof for ejecting the workpiece as will hereafter be described.

Figure 6:
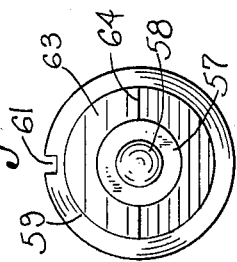
FIG. 6 is a front elevational view of the punch of FIG. 5.
Figure 5:
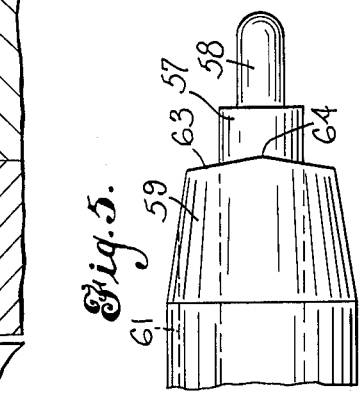
FIG. 5 is a partial side elevational view of the nose portion of a punch shown in FIG. 4.

A punch plate 55 carries a third punch holder 56 in which is mounted a trimming punch 57 having a projecting end 58 of smaller diameter. The diameter of projecting end 58 is approximately equal to the diameter of cylindrical bore 46 in workpiece 44. Surrounding trimming punch 57 is a severing punch 59 which, when mounted in the third punch holder 56, is stationary with respect to the trimming punch. However, to prevent rotation of the severing punch about its longitudinal axis, the severing punch is provided with a groove 61 which cooperates with a pin 62 mounted in punch holder 56. The leading end or tip 63 of the severing punch is beveled as shown in FIGS. 5 and 6 away from a diameter to define a sharp edge 64 whose use will be hereafter explained.

Punch plate 55 also carries a fourth punch holder 65 which carries, in the face thereof, an ironing punch 66. Extending inwardly from the face of the ironing punch is a tapered bore 67 communicating with a bore of uniform diameter 68. Slidably mounted in fourth punch holder 65 and extending into bore 68 is a knockout rod 69 which carries a stop sleeve 71 to limit the longitudinal movement of the knockout rod. A headed drive rod 72 is slidably mounted in punch plate 55 for advancing the knockout rod. A plate 73 provided with a cammed surface 74 is disposed to contact the head of drive rod 72 to advance the knockout rod at the proper time in the cycle of operation. A clearance bore 75 is provided in die bed 15 for receiving knockout rod 69 when the gate is in the advanced position and the third punch holder is in the non-operating position shown in FIG. 4. Die bed 15 is also provided with a beveled edge 76 to provide clearance for trimming punch 57 and severing punch 59 when the gate is in the advanced position and the third punch holder is in the non-operating position shown in FIG. 7.

The sequence of operations at station 2 will now be described. Workpiece 44 is transferred from the first station into alignment with the cavity in second die 51. As the gate advances, projecting end 58 of the trimming punch is inserted in bore 46 to support the outer end of the bore and, when the shoulder of trimming punch 57 contacts the end of the workpiece, the workpiece is driven into the die cavity. The inner or second cylindrical cavity 53 has substantially the same diameter as the main body of workpiece 44 and the insertion of the workpiece in the cavity will not change this diameter. However, the diameter of first cavity 52 is slightly larger than the diameter of the body of workpiece 44 but smaller than the diameter of shoulder 45. Thus, the advancement of the workpiece into the second die trims a portion of the shoulder at the face of the die as shown in FIG. 4. The resultant workpiece is shown at enlarged scale in FIG. 10. Workpiece 78 is substantially the same length as workpiece 44 and the outside diameter of its major length is also the same. In addition, cylindrical bore 79 has the same diameter as bore 46. As may be clearly seen by comparison of FIGS. 10 and 9, shoulder 81 is of considerably smaller diameter than shoulder 45, although the longitudinal lengths of the two shoulders is approximately equal.

Referring again to FIG. 4, the portion 82 trimmed from the workpiece encircles trimming punch 57. As severing punch 59 continues to advance, sharp edge 64 strikes the sheared portion and fractures the circular section into two halves which will thereafter fall away. On completion of the forming operation on the first blow at the second station, the gate recedes and trimming punch 57 is withdrawn from the workpiece. Thereafter, punch plate 55 shifts to bring the fourth punch holder into axial alignment with the die cavity. Also, knockout rod 54 is advanced by any suitable mechanism known in the art to partially eject workpiece 78 from the die cavity to the position shown in FIG. 7. The gate is then advanced for the second blow and knockout rod 69 first comes into contact with the end of the workpiece. Since the knockout rod freely slides in the punch holder, the knockout rod will be caused to recede into the punch holder as ironing punch 66 approaches the workpiece. The workpiece first enters tapered bore 67 and then uniform bore 68. The diameter of the uniform bore is substantially the same as the diameter of the major portion of the workpiece, thereby causing shoulder 81 to be ironed inwardly by advancement of the ironing die. On completion of gate advancement, the workpiece is provided with an external cylindrical surface of uniform diameter. The resultant workpiece 83 is shown at enlarged scale in FIG. 11, wherein it may clearly be seen that the outside diameter of the workpiece is uniform throughout its length. Also, the length of the workpiece is unchanged from the previous step and the internal cylindrical bore 84 has the same diameter as bore 79. However, the outermost portion 85 of the bore is of smaller diameter and the workpiece for the length of the bore of reduced diameter has a greater wall thickness. This is due to the inward displacement of shoulder 81 during the ironing operation.

As the gate and punch plate 55 recede after completion of the second blow, it is necessary for the workpiece to be positively driven out of the ironing punch to prevent withdrawal of the workpiece from the die. This is accomplished by advancing plate 73 by suitable means (not shown) to cause cam surface 74 to ride over the head of drive rod 72, thereby ejecting the workpiece from the ironing punch as the punch recedes. Thereafter, knockout rod 54 is advanced to eject the workpiece from the second die so that the workpiece may either be transferred to a further station for the performance of additional operations or completely ejected from the machine.

Because of the increased wall thickness of the completed article at the end of bore entry, the article may now be threaded without causing a reduction in strength or a weakening of its structural integrity.

While the forming operations heretofore described are preferred for the accurate and smooth development of the final article from the initial blank, the invention contemplates the omission of certain steps without departing from the invention. If an article is to be produced without stringent quality control requirements or if the material used is relatively soft, or if the final article is proportionately shorter than that depicted in the preferred embodiment, it would be possible to form an article having a uniform bore and a small shoulder in a first step and subsequently iron the shoulder to decrease the size of the bore at its end of entry in the second step in accordance with the teachings of the invention. While this would require the utilization of an extruding pin, an extruding punch and an ironing punch, it would be possible to perform the simplified method in a single die, although the utilization of two dies is preferred.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. The method of making a hollow article having an outer bore of lesser diameter than an inner bore, comprising cutting a workpiece from a length of solid stock, confining the workpiece in a substantially uniform cavity of a predetermined depth in a die, driving an extruding pin into the workpiece to extrude a portion of the workpiece rearwardly around the extruding pin to form an elongated workpiece having a cylindrical bore extending into the workpiece from one end thereof, increasing the effective depth of the cavity at a reduced diameter, driving a mandrel into the initial portions of the bore in the workpiece and driving a portion of the workpiece into the deepened cavity of lesser diameter by pressure applied to the end of the workpiece through an extruding punch while maintaining the mandrel in the bore to prevent collapse of the bore and to extrude and lengthen the workpiece in the cavity of lesser diameter and form a peripheral shoulder at the outer end of the workpiece, stripping the workpiece from the mandrel, ejecting the workpiece from the die cavity, transferring the workpiece to a second die, driving the workpiece into a cavity in the second die whose diameter is less than the diameter of the previously-formed shoulder on the workpiece by pressure applied to the end of the workpiece through a trimming punch to trim a portion of the shoulder from the workpiece, splitting the trimmed portion while the workpiece is wholly within the cavity in the second die, partially ejecting the workpiece from the second die and holding it in the partially ejected position, ironing the remaining shoulder into the workpiece by pressure applied to the shoulder through an ironing punch to provide a uniform outside diameter along the length of the workpiece and to decrease the diameter of the bore in the workpiece for a length approximately equal to the length of the previously-formed shoulder, driving the workpiece out of the ironing punch by pressure applied to the end of the workpiece through a knockout rod within the ironing punch, and ejecting the finished article from the second die.

2. The method of making a hollow article having an outer bore of lesser diameter than an inner bore, comprising cutting a workpiece from a length of solid stock, confining the workpiece in a substantially uniform cavity of a predetermined depth, driving an extruding pin into the workpiece to extrude a portion of the workpiece rearwardly around the extruding pin to form an elongated workpiece having a cylindrical bore extending into the workpiece from one end thereof, increasing the effective depth of the cavity at a reduced diameter, driving a supporting member into the initial portions of the bore in the workpiece and driving a portion of the workpiece into the deepened cavity of lesser diameter while maintaining the supporting member in the bore to prevent collapse of the bore and to extrude and lengthen the workpiece in the cavity of lesser diameter and form a peripheral shoulder at the outer end of the workpiece, stripping the workpiece from the supporting member, driving the workpiece into a second cavity whose diameter is less than the diameter of the previously-formed shoulder on the workpiece to trim a portion of the shoulder from the workpiece, splitting the trimmed portion while the workpiece is wholly within the cavity, partially ejecting the workpiece from the second cavity and holding it in the partially ejected position, ironing the remaining shoulder into the workpiece to provide a uniform outside diameter along the length of the workpiece and to decrease the diameter of the bore in the workpiece for a length approximately equal to the length of the previously-formed shoulder, and ejecting the finished article from the second cavity.

3. The method of making a hollow article having an outer bore of lesser diameter than an inner bore, comprising cutting a workpiece from a length of solid stock, confining the workpiece in a substantially uniform cavity of a predetermined depth, driving an extruding pin into the workpiece to extrude a portion of the workpiece rearwardly around the extruding pin to form an elongated workpiece having a cylindrical bore extending into the workpiece from one end thereof, increasing the effective depth of the cavity at a reduced diameter, driving a supporting member into the initial portions of the bore in the workpiece and driving a portion of the workpiece into the deepened cavity of lesser diameter while maintaining the supporting member in the bore to prevent collapse of the bore and to extrude and lengthen the workpiece in the cavity of lesser diameter and form a peripheral shoulder at the outer end of the workpiece, driving the workpiece into a second cavity whose diameter is less than the diameter of the previously-formed shoulder on the workpiece to trim a portion of the shoulder from the workpiece, splitting the trimmed portion while the workpiece is wholly within the cavity, partially ejecting the workpiece from the second cavity and holding it in the partially ejected position, ironing the remaining shoulder into the workpiece to provide a uniform outside diameter along the length of the workpiece and to decrease the diameter of the bore in the workpiece for a length approximately equal to the length of the previously-formed shoulder, and ejecting the finished article from the second cavity.

4. The method of making a hollow article having an outer bore of lesser diameter than an inner bore, comprising cutting a workpiece from a length of solid stock, confining the workpiece in a substantially uniform cavity of a predetermined depth, driving an extruding pin into the workpiece to extrude a portion of the workpiece rearwardly around the extruding pin to form an elongated workpiece having a cylindrical bore extending into the workpiece from one end thereof, increasing the effective depth of the cavity at a reduced diameter, driving a supporting member into the initial portions of the bore in the workpiece and driving a portion of the workpiece into the deepened cavity of lesser diameter while maintaining the supporting member in the bore to prevent collapse of the bore and to extrude and lengthen the workpiece in the cavity of lesser diameter and form a peripheral shoulder at the outer end of the workpiece, driving the workpiece into a second cavity whose diameter is less than the diameter of the previously-formed shoulder on the workpiece to trim a portion of the shoulder from the workpiece, partially ejecting the workpiece from the second cavity and holding it in the partially ejected position, ironing the remaining shoulder into the workpiece to provide a uniform outside diameter along the length of the workpiece and to decrease the diameter of the bore in the workpiece for a length approximately equal to the length of the previously-formed shoulder, and ejecting the finished article from the second cavity.

5. The method of making a hollow article having an outer bore of lesser diameter than an inner bore, comprising cutting a workpiece from a length of solid stock, confining the workpiece in a substantially uniform cavity of a predetermined depth in a die, driving an extruding pin into the workpiece to extrude a portion of the workpiece rearwardly around the extruding pin to form an elongated workpiece having a cylindrical bore extending into the workpiece from one end thereof, increasing the effective depth of the cavity at a reduced diameter, driving a mandrel into the initial portions of the bore in the workpiece and driving a portion of the workpiece into the deepened cavity of lesser diameter by pressure applied to the end of the workpiece through an extruding punch while maintaining the mandrel in the bore to prevent collapse of the bore and to extrude and lengthen the workpiece in the cavity of lesser diameter and form a peripheral shoulder at the outer end of the workpiece, partially ejecting the workpiece from the die cavity and holding it in the partially ejected position, ironing the remaining shoulder into the workpiece by pressure applied to the shoulder through an ironing punch to provide a uniform outside diameter along the length of the workpiece and to decrease the diameter of the bore in the workpiece for a length approximately equal to the length of the previously-formed shoulder, driving the workpiece out of the ironing punch by pressure applied to the end of the workpiece through a knockout rod within the ironing punch, and ejecting the finished article from the die.

6. The method of making a hollow article having an outer bore of lesser diameter than an inner bore, comprising cutting a workpiece from a length of solid stock, confining the workpiece in a substantially uniform cavity of a predetermined depth in a die, driving an extruding pin into the workpiece to extrude a portion of the workpiece rearwardly around the extruding pin to form an elongated workpiece having a cylindrical bore extending into the workpiece from one end thereof, increasing the effective depth of the cavity at a reduced diameter, driving a mandrel into the initial portions of the bore in the workpiece and driving a portion of the workpiece into the deepened cavity of lesser diameter by pressure applied to the end of the workpiece through an extruding punch while maintaining the mandrel in the bore to prevent collapse of the bore and to extrude and lengthen the workpiece in the cavity of lesser diameter and form a peripheral shoulder at the outer end of the workpiece, stripping the workpiece from the mandrel, ejecting the workpiece from the die cavity, transferring the workpiece to a second die, inserting the workpiece into a cavity whose depth provides for receiving only the lower end of the workpiece to hold the portion of the workpiece carrying the shoulder extended above the cavity, ironing the shoulder into the workpiece by pressure applied to the shoulder through an ironing punch to provide a uniform outside diameter along the length of the workpiece and to decrease the diameter of the bore in the workpiece for a length approximately equal to the length of the previously-formed shoulder, driving the workpiece out of the ironing punch by pressure applied to the end of the workpiece through a knockout rod within the ironing punch, and ejecting the finished article from the second die.

References Cited by the Examiner

UNITED STATES PATENTS

| 2,340,784 | 2/1944 | Westin | 219—151 |
| 2,557,722 | 6/1951 | Brauchler | 72—343 |
| 2,932,889 | 4/1960 | Kritscher | 72—343 |

FOREIGN PATENTS

| 4,661 | 1911 | Great Britain. |

RICHARD J. HERBST, *Primary Examiner.*

H. D. HOINKES, *Examiner.*